UNITED STATES PATENT OFFICE.

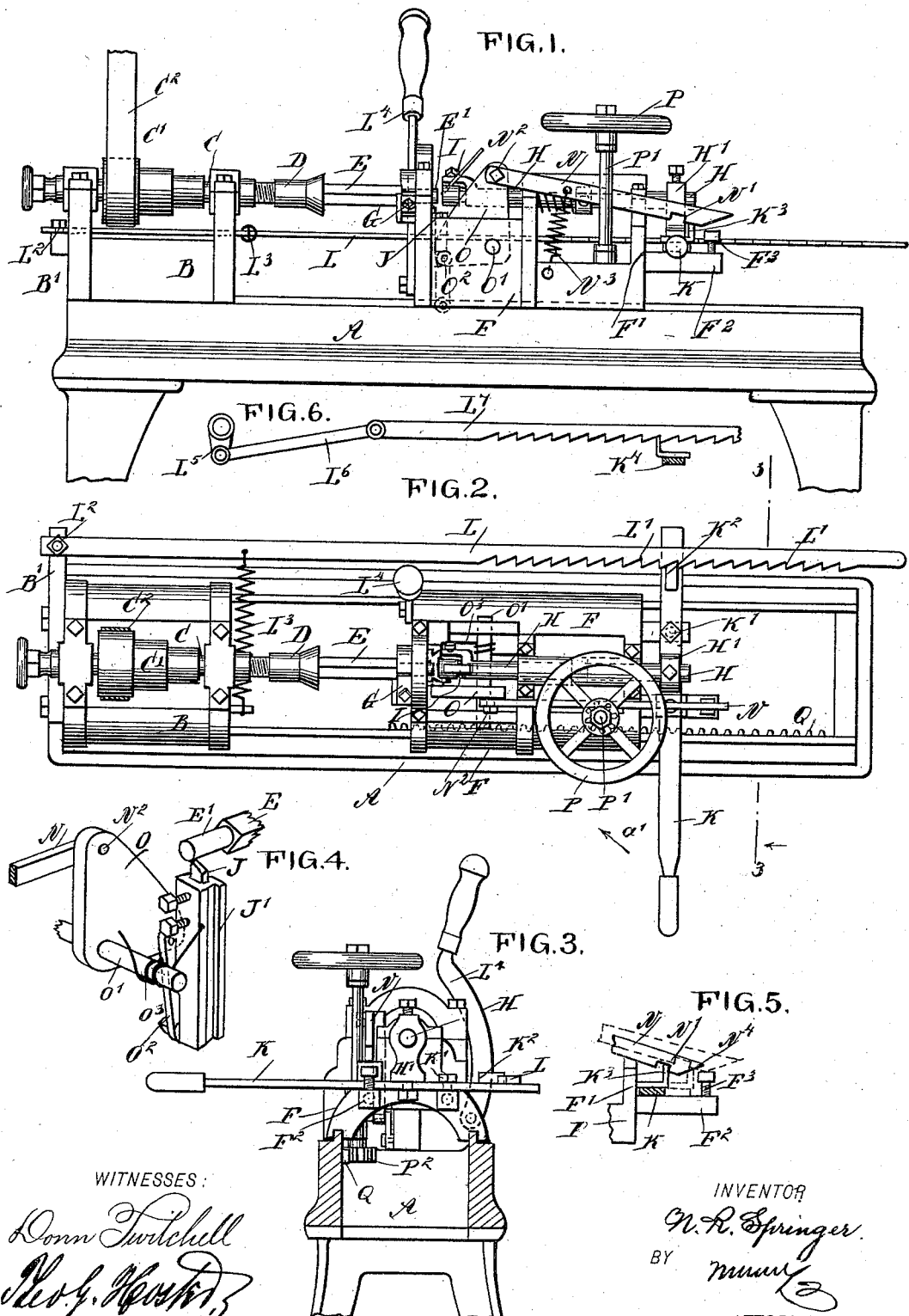

NELSON R. SPRINGER, OF DIXFIELD, MAINE.

WOOD-TURNING LATHE.

SPECIFICATION forming part of Letters Patent No. 611,522, dated September 27, 1898.

Application filed December 28, 1897. Serial No. 663,891. (No model.)

*To all whom it may concern:*

Be it known that I, NELSON R. SPRINGER, of Dixfield, in the county of Oxford and State of Maine, have invented a new and Improved Wood-Turning Lathe, of which the following is a full, clear, and exact description.

The object of the invention is to provide a new and improved wood-turning lathe which is simple and durable in construction and arranged to facilitate the turning of checkers and other articles.

The invention consists of novel features and parts and combinations of the same, as will be fully described hereinafter and pointed out in the claims.

Reference is to be had to the accompanying drawings, forming a part of this specification, in which similar characters of reference indicate corresponding parts in all the figures.
Figure 1 is a side elevation of the improvement. Fig. 2 is a plan view of the same. Fig. 3 is a transverse section of the improvement on the line 3 3 of Fig. 2. Fig. 4 is an enlarged perspective view of the cut-off device. Fig. 5 is a side elevation of the carriage-shifting lever and the connection for the cut-off device, and Fig. 6 is a sectional side elevation of a modified form of carriage feed-bar.

The improved wood-turning lathe is provided with the usual bed A, the head-stock B, the spindle C, journaled in the said head-stock, and provided with the usual cone-pulley C', connected by a belt $C^2$ with other machinery for rotating the spindle. The spindle carries a suitable chuck D for engaging the stick of wood E to be turned into checkers or other articles, which stick is usually square in cross-section.

On suitable guideways on the bed A is fitted to slide a carriage F, carrying at its forward end a cutter G for turning the stick of wood E round, and in suitable bearings on the carriage F is fitted to slide longitudinally a shaft H, carrying at its forward end a cutter I, adapted to engage the face of the rounded end E' of the stick E to ornament the said face according to the design intended for the article under treatment. After the face is turned then a cutter J engages the rounded-off end E' to cut a portion therefrom to produce the finished article, the said cutter J being secured in a holder J', fitted to slide vertically in the forward end of the carriage F between the cutter G and the cutter-head I. (See Fig. 1.)

In order to impart the desired movement to the carriage F, the cutter-head I and the cutter J are provided with the following device, so that the distance the carriage and the cutters are moved corresponds to the desired thickness intended to be given to the finished article.

On the rear end of the carriage F is fulcrumed at K' a transversely-extending hand-lever K, adapted to be taken hold of at its forward end by the operator, the rear end of the lever carrying a tooth or pawl $K^2$, adapted to engage one of a series of teeth L', formed on a carriage-feed bar L, extending longitudinally at the rear of the carriage F and fulcrumed at $L^2$ to a bracket B', carried on the head-stock B. A spring $L^3$ draws on the bar L, so as to hold its toothed side in engagement with the tooth or pawl $K^2$, a hand-lever $L^4$ being provided on the carriage F for engagement with the said bar to swing the same rearwardly out of engagement with the tooth $K^2$ whenever it is desired to shift the carriage F longitudinally when putting in a new stick E, or for other purposes.

The lever K is connected with an upright arm H', attached to the rear end of the shaft H to impart a longitudinal sliding motion to the said shaft and the cutter-head I to move the cutters thereof in contact with the face at the end of the stick E for the purpose previously mentioned. The lever K is further provided with a lug $K^3$, (see Figs. 1, 5, and 7,) adapted to engage a shoulder N' on the under side of an arm N, fulcrumed at $N^2$ on a lever O, having its transverse pivot-pin O' journaled in suitable bearings in the carriage F.

The lever O is provided with a link $O^2$, connected with the block J', carrying the cut-off knife or cutter J, said block J' being connected by a spring $O^3$ with the pivot-pin O' and the lever O, as plainly shown in Fig. 4, to insure a return movement of the cutter J after the article is cut off from the end of the stick E.

The lug $K^3$ is adapted to abut against the end F' of the carriage F, (see Fig. 5,) and the free end of the arm N is beveled, as at $N^4$, to engage a stop-screw F³, secured on a bracket F², projecting from the rear end of the carriage F.

Now it is evident that when the lever K is moved in the inverse direction of the arrow $a'$ and the lug K³ engages the shoulder N' then the arm N is pulled to the right to impart a swinging motion to the lever O, which by the link O² moves the block J' and the knife or cutter J upward to cut off the article from the end of the stick. When the lever K moves in the direction described, the beveled end N⁴ of the arm N finally comes in contact with the stop-screw F³, so that the said beveled end rides up the stop-pin and finally moves the shoulder N' out of engagement with the lug K³ to permit the spring C³ to return the several parts of the cut-off device back to the former position. (Shown in Fig. 1.) A spring N³, pressing on the arm N, serves to hold the latter in contact with the lug K³, as will be readily understood by reference to Figs. 1 and 5.

The operation is as follows: When the several parts are in the position illustrated in the drawings and a portion of the free end of the stick E has been turned round by the action of the cutter G, then the operator first moves the lever K in the direction of the arrow $a'$ to cause a forward sliding of the carriage F as the lever K turns on the tooth K² as the fulcrum, and bodily movement is given to the said carriage to bring the cutter-head I in engagement with the face of the round end E' of the stick E. When the lever K swings forward, as described, its lug K³ finally moves under the shoulder N' of the arm N, as shown in Fig. 5, and when the face of the end E' has been trimmed by the cutter-head I then the operator imparts a swinging motion to the lever K in the inverse direction of the arrow $a'$. The said lever then swings on its fulcrum K' to engage the teeth K² with the next forward tooth L' on the bar L and at the same time pulls on the arm N, as is plainly described, to actuate the cutter J and cut off the article from the round end of the stick E. When this has been done, then the operator pulls the lever K again in the direction of the arrow $a'$ to shift the carriage F bodily forward and cause the cutter G to trim off more of the stick and to bring the cutter-head I against the face of the round end to ornament the same. When the operator moves the lever K in the inverse direction of the arrow $a'$, the second article is cut off from the round end of the stick in the manner previously described. The above operation is then repeated, it being understood that a bodily-forward movement is given to the carriage F as the lever K advances on the notched bar L. It is understood that the bar L has its teeth L' placed such a distance apart as corresponds to the height of the articles to be cut off from the stick, and for different articles different toothed bars L are employed.

When it is desired to run the carriage F back to the right when a new stick is introduced, a hand-wheel P is turned, the said hand-wheel being secured on a shaft P', journaled in suitable bearings on the carriage F and carrying at its lower end a pinion P², in mesh with a rack Q, fixed on the inside of the bed A.

When the lever K is moved in the inverse direction of the arrow $a'$ for actuating the cut-off device, then the shaft H is moved rearward to bring the cutter-head I away from the face of the stick, so that the cutter of the knife J can readily cut off the finished end.

The carriage-feed may be arranged, as shown in Fig. 6, to automatically feed the carriage forward, and in this case I provide a crank-arm L⁵, actuated from some suitable part of the lathe and connected by a link L⁶ with the toothed feed-bar L⁷, engaged by the lever K⁴, connected with the carriage and other parts, as described.

Having thus fully described my invention, I claim as new and desire to secure by Letters Patent—

1. A lathe provided with a carriage mounted to slide, a lever for imparting a sliding movement to the said carriage, a toothed bar adapted to be engaged by the lever to move the carriage forward a predetermined distance, and a cutter-head movable in the carriage and adapted to face off the end of the stick, the said cutter-head being controlled from the said lever, substantially as shown and described.

2. A lathe provided with a carriage mounted to slide, a cutter-head movable in the carriage, and adapted to face off the end of the stick, a lever for imparting a sliding movement to the said carriage, a toothed bar adapted to be engaged by the lever to move the carriage forward a predetermined distance, and a cut-off device controlled from the said lever, to cut off the article from the end of the stick, substantially as shown and described.

3. A lathe provided with a carriage mounted to slide, a lever connected with the said carriage, a toothed bar adapted to be engaged by the lever to move the carriage forward a predetermined distance, a cutter-head movable in the carriage and adapted to face off the end of the stick, the said cutter-head being controlled from said lever, and a cutter fixed on the carriage for turning the end of the stick round previous to facing it, substantially as shown and described.

4. A lathe provided with a movable carriage, a cut-off knife or cutter on said carriage, for cutting off the end of the stick, a lever for imparting movement to the said knife or cutter, an arm connected with the said lever, and a hand-lever fulcrumed on the carriage, and adapted to engage the said arm to actuate the lever and knife, substantially as shown and described.

5. A lathe provided with a movable carriage, a cut-off knife or cutter on said carriage, for cutting off the end of the stick, a lever for imparting movement to the said knife or cutter, an arm connected with the said lever, a hand-lever fulcrumed on the carriage, and adapted to engage the said arm to actuate the lever and knife, and a stop on the carriage, and adapted to be engaged by the said arm to move the latter out of engagement with the said hand-lever, substantially as shown and described.

6. A lathe provided with a movable carriage carrying a turning cutter for rounding the stick, a lever for imparting movement to the carriage, a cutter for facing the stick and controlled from the said lever, and a cutter for cutting off the finished end of the stick and also controlled from the said lever, the said cutters being arranged to act successively, substantially as described.

7. A lathe provided with a slidable block adapted to carry a cutter, a spring-pressed lever, a link carried by the said lever and connected with the said block, an arm fulcrumed on said lever and provided with a shoulder, and a hand-lever provided with a lug adapted to engage the shoulder of the said arm whereby a sliding motion is imparted to the said block, substantially as shown and described.

8. A lathe provided with a movable carriage, a toothed bar fulcrumed at one end, a lever fulcrumed on the carriage and arranged for engagement with the teeth of the said bar to shift the carriage forward, cutters carried by the said carriage and controlled from the said lever, a spring for holding said toothed bar in engagement with the lever, and means for swinging the said bar out of engagement with the lever to permit of returning the carriage, substantially as described.

NELSON R. SPRINGER.

Witnesses:
GEORGE L. MERRILL,
L. R. MELD.